April 29, 1930. W. J. BAUMBERGER 1,756,908
GRINDING MACHINE
Filed Feb. 6, 1928    8 Sheets-Sheet 3

April 29, 1930.  W. J. BAUMBERGER  1,756,908
GRINDING MACHINE
Filed Feb. 6, 1928  8 Sheets-Sheet 5

INVENTOR
W.J. Baumberger
BY Evans & McCoy
ATTORNEYS

April 29, 1930. W. J. BAUMBERGER 1,756,908
GRINDING MACHINE
Filed Feb. 6, 1928 8 Sheets-Sheet 6

INVENTOR
W. J. Baumberger
BY Evans & McCoy
ATTORNEYS

April 29, 1930.  W. J. BAUMBERGER  1,756,908
GRINDING MACHINE
Filed Feb. 6, 1928   8 Sheets-Sheet 8

INVENTOR
W. J. Baumberger
BY
Evans & McCoy
ATTORNEYS

Patented Apr. 29, 1930

1,756,908

UNITED STATES PATENT OFFICE

WILLIAM J. BAUMBERGER, OF DAVENPORT, IOWA, ASSIGNOR TO MICRO MACHINE COMPANY, OF BETTENDORF, IOWA, A CORPORATION OF IOWA

GRINDING MACHINE

Application filed February 6, 1928. Serial No. 252,115.

This invention relates to machines for generating surfaces of revolution and more particularly to machines in which such surfaces are generated by the action of a rotating cutting or generating element acting on a rotating blank and having movement relative to the blank such that the point or line of tangency between the cutting element and the surface moves along a generatrix of the surface of revolution.

It is an object of the invention to provide universal adjustment of the spindles of the work and cutting element so that the spindles may be positioned at any desired angle with respect to each other with the cutting element at any desired distance from the work spindle and with centers of the work and cutting element in any desired position with respect to the axis of angular adjustment within the limits of the machine in order to enable the cutting element to operate interiorly or exteriorly of the work or upon a face thereof as desired.

A further object of the invention is to provide means for operating the machine either with the axes of the spindles in fixed positions and for imparting a linear feed movement to one of the spindles for generating surfaces of revolution having straight line generatrices such as cones or cylinders, or for operating the machine with one of the spindles oscillating to cause movement of the cutting element on a curved generatrix of surfaces of revolution such as spherical or annular concave or convex surfaces.

Broadly considered, the present invention relates to generating machines employing rotating cutting elements but certain features of the invention are particularly advantageous for machines in which an emery or other abrasive wheel is employed as the cutting or generating element. It has been found that, when a grinding wheel has a translatory movement over the surface of the work, the best results are obtained when the speed of rotation of the work and the speed of translatory movement of the grinding wheel bear a fixed relation to each other. It has also been found that the best results are obtained at different speeds of rotational and translatory movements of the work and grinding wheel with blanks of different diameters and that different speeds are desirable for wet and dry grinding.

The present invention has for an important object to provide a common drive for the work spindle and for the mechanism for imparting a translatory movement to the grinding wheel so as to maintain a constant ratio between the two movements and further, to provide a change speed mechanism common to the work spindle and grinder shifting mechanism which is capable of changing the speed of both simultaneously without disturbing the speed ratio and of changing the speed in exceedingly small increments or with intermerging gradations throughout a relatively wide range of speeds so that the speeds most effective for a blank of any diameter within the range of the machine may be obtained.

A further object is to provide in addition to the above mentioned change speed mechanism, a second change speed mechanism affecting the grinder shifting mechanism only so that the speed ratio between the spindle rotating and grinder shifting mechanism may be changed when desired.

A further object of the invention is to provide an automatic spindle oscillating mechanism by which one of the spindles is caused to oscillate about an axis at an angle thereto and to provide means for varying the amplitude of oscillation and for adjusting the position of the arc of oscillation as desired.

A further object is to provide manually controlled power operated means for imparting a rapid angular movement to the oscillatory head when desired for purpose of adjustment.

A further object is to provide means for temporarily disconnecting the oscillatory head from its power operated actuating mechanism and for then shifting said head manually to insure proper positioning of the grinder with respect to the work.

A further object is to provide a system of lubrication for the arcuate way upon which the oscillatory head is mounted whereby there is a minimum of frictional resistance to the movement of said head on said way.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Referring to the accompanying drawings.

Figs. 17 to 28, inclusive, are diagrammatic views showing the relative adjustments and movements of the grinding wheel with respect to the work.

The machine of the present invention is a universal generating machine capable of generating cylindrical, conical or spherical internal or external surfaces or of generating annular concave or convex surfaces upon the interior, exterior or side face of a blank. The cutting element is herein shown as a grinding wheel which is mounted for angular adjustment and also for oscillation on an arc of any desired radius, the work supporting head and grinder supporting head being adjustable to position the grinding wheel and work with their axes at the desired distances from the center of oscillation and with the work properly positioned with respect to the arcuate path of the grinding wheel.

As shown in the accompanying drawings, the machine is provided with a supporting base or frame 1, which has at one end, a horizontal bed 2 which is formed to provide a way 3 extending longitudinally of the machine, on which is mounted a slide 4, which is adapted to be moved along the way 3 upon the bed 2 and which is formed to provide a transverse way 4 on its upper side, which provides a guide for a slidable head 6, which carries bearings 7 for a horizontal work spindle 8, which carries at its inner end a suitable work holding chuck 9.

In order to accurately indicate the setting of the slide 4, the body 2 is provided along its forward edge with a graduated scale 10 and the head 4 is provided immediately over the scale 10 with a single graduation or pointer 11 which moves over the scale 10 as the slide 4 is adjusted. The slide 4 is provided on its outer end with a scale 12 similar to the scale 10 on the bed 2, which co-operates with a suitable graduation or pointer on the spindle supporting head 6 to accurately indicate the lateral adjustment of the spindle head on the slide 4. The head 4 is adjusted on the bed 2 by means of a longitudinal lead screw 13 which is journaled in suitable thrust bearings on the frame 1 and which has threaded engagement with a nut 14 fixed to the under side of the slide 4 and projecting through a slot in the bed 2. The lead screw 13 has fixed thereto a bevel gear 15 which meshes with a bevel gear 16 on a transverse shaft 17, which extends through the front wall of the supporting frame and is provided at its outer end with squared portion 18 adapted to receive a suitable actuating crank. The screw 13 may be extended through the adjacent end wall of the frame and be provided with a squared end 19 so that a crank may be directly attached thereto.

The head 6 is adjusted transversely of the frame on the way 5 on the top of the slide 4 by means of a lead screw 20 which extends to the front side of the machine and which has a squared end for receiving an actuating crank. The slide 4 and head 6 provide adjustments for the work spindle 8 longitudinally of the frame and spindle and in a direction at right angles thereto.

The end of the machine opposite that supporting the work spindle head is provided with a bed 21 which has at its outer edge an arcuate guide 22 providing a support for an oscillatory supporting member 23, which is provided with an arcuate groove 24 which receives the arcuate guide 22 upon which the supporting member 23 slides, the guide 22 and groove 23 being concentric with a central pivot 25 about which the member 23 turns. The supporting member 23 is provided upon the top thereof with a radially disposed guideway 26 upon which is mounted a slide 27 which is moved back and forth on the guideway toward and from the pivotal axis of the supporting member 23 by means of a lead screw 28. The slide 27 has upon its upper side, a guideway 29 which is disposed at right angles to the guideway 26 and mounted on this guideway is a supporting head 30 which is adapted to be adjusted back and forth along the guideway 29 by means of a lead screw 31. While the adjusting screws for the lateral and longitudinal adjustment of the work spindle and grinder heads are herein shown as manually operable, it is to be understood to be within the scope of the invention to provide power operated driving connections for the adjusting screws. The head 30 carries a bearing bracket 34 in which is journaled a spindle 35 which carries at its inner end a cutting element 36 herein shown as a grinding wheel which will be of a diameter and thickness and have a peripheral form suitable for the particular curve and surface to be generated upon the work. Upon the outer side thereof, the head 30 carries a supporting bracket 37 upon which is mounted an electric motor 38 which has an inwardly projecting rotor shaft 39 to which is fixed a pulley 40. The spindle 35 and motor shaft 39 are parallel with each other, but laterally offset and the spindle 35 carries a pulley 41 in alinement with the pulley 40 on the motor shaft. The spindle 35 is driven from the motor shaft 39 by means of a belt 42 which is looped over the closely adjacent pulleys 40 and 41 and passes over a fixed idler 43 and a yieldably mounted adjustable idler 44 carried by the head 30 below the pulleys 40 and to the opposite sides thereof. During the operation of the machine, the cutting element is constantly driven at a high rate of speed by means of the electric motor 39 through the belts and pulleys above described.

Oscillatory movement may be imparted to the grinder head during the operation of the machine by means of a driving mechanism which will later be described in detail, the supporting member 23 being provided with an internal gear segment 45 concentric with the pivot 25 with which a pinion 46 carried by a vertical shaft 47 meshes. Rotary movement alternately in opposite directions is imparted to the vertical shaft 47 causing the grinder head to oscillate during the operation of the machine.

The work spindle 8 is continuously rotated during the operation of the machine, the spindle being driven through a gear 48 fixed to the outer end of the spindle and driven by a pinion 49 meshing therewith. The gears 48 and 49 are housed within a gear case 50 and the gear 49 is fixed to a shaft 51 journaled in the housing 50 and carrying a pulley 52 outside the housing. The pulley 52 is driven by means of a belt 53 which extends over the pulley 52 and over a pulley 54 on a longitudinal shaft 55 mounted in the frame adjacent the base thereof, the belt 53 being kept taut by means of a tightening pulley 56 carried by an arm 57 pivoted to the gear case 50 at its lower end and connected at its upper end by spring 58 to the gear case so as to yieldingly press the pulley 56 against the belt 53. The shaft 55 has rotatably mounted thereon a gear 59 which carries a clutch element 60 which is adapted to be engaged by a shiftable clutch element 61 splined to the shaft. The clutch element 61 is engaged by a shifter fork 62 carried by a rock shaft 63, which extends through the front wall of the supporting frame and has attached thereto an actuating lever 64, by means of which the shaft may be rocked to move the clutch element 61 into or out of engagement with the clutch element 60 carried by the gear 59. When the clutch element 60 and 61 are disengaged, the gear 59 rotates freely on the shaft 55 and the work spindle is disconnected from its driving mechanism. The gear 59 is continuously driven by means of a gear 65 fixed to a counter shaft 66 parallel with the the shaft 55 and the shaft 66 is driven through a pulley 67 fixed thereto over which runs a belt 68 which extends over a pulley 69 fixed to a horizontal shaft 70 on the rear side of the frame.

It is desirable that means be provided for varying the speed of rotation of the work spindle in small increments over a relatively wide range of speeds and, to provide for the fine adjustment in the speed of the work spindle, the work spindle is driven through a change speed mechanism of the friction type, capable of a wide range of adjustment and of varying the speed with intermerging gradations from the lowest to the highest speed. The shaft 70 carries an elongated cone 71, which is driven by means of a short shiftable belt 72 from an upper cone 73 which is of the same size and shape as cone 71, but oppositely disposed with respect thereto, the cone 73 being fixed to a shaft 74 which is parallel with the shaft 70, and the two cones being spaced apart just sufficiently to frictionally grip the belt 72 between them. The belt 72 is a short belt which is gripped between the cones 71 and 73 and hangs freely from the cone 71. During operation, the upper cone 73 drives the lower cone 71 through the short belt 72 and the speed ratio between the shafts 70 and 74 is determined by the longitudinal position of the belt 72 between the cones. When the belt 72 is at the large end of the cone 73, the shaft 70 is driven at its highest speed and when the belt 72 is at the small end of the cone 73, the shaft 70 is driven at its lowest speed, any speed intermediate the highest and lowest speeds being obtainable by properly positioning the belt 72. The belt 72 is engaged by a shifter fork 75, which is mounted to slide on a guide rod 76 mounted alongside the lower cone 71 and the fork 75 is moved along the guide rod 76 by means of a chain 77, which is attached at its opposite ends to the opposite sides of the fork 75 and extends around a series of idlers 78 and over an actuating sprocket 79. The sprocket 79 is fixed to a transverse shaft 80 which extends through the front wall of the supporting frame and has attached thereto a handle 81 by means of which it may be turned to shift the fork 75 along the guide rod 76 and the belt 72 longitudinally of the cones. The upper shaft 74 has fixed thereto a gear 82 which meshes with a small gear 83 on the shaft of an electric motor 85 by means of which the shaft 74 may be continuously driven. It is desirable that the grinding wheel or other generating element have a lateral movement over the surface of the work which is proportional to the speed of rotation of the work. Since the lateral movement of the grinding wheel with respect to the surface of the work is produced by the oscillating movement of the grinder head, means is provided for driving the grinder oscillating mechanism by the motor 84 through the change speed mechanism above described so that the rate of oscillation of the grinding wheel will be in a predetermined ratio to the spread of rotation of the work spindle and this ratio will not be changed by varying the speed of rotation of the work spindle. The grinder oscillating mechanism is therefore driven from the driven shaft 70 of the frictional change speed mechanism, the shaft 70 being provided with a small pulley 85 which drives a belt 86 which extends over a pulley 87 fixed to a longitudinal shaft 88 adjacent the front of the supporting frame. The shaft 88 has fixed thereto a bevel gear 89 which meshes with a bevel gear 90 on a transverse shaft 91 and the shaft 91 has fixed thereto a pulley 92 which drives a belt 93 extending over a pulley 94 fixed to a transverse shaft 95 at the end of the frame adjacent the grinder supporting bed 22. The shaft 95 extends into a gear case 96 which houses reversing gearing by which the direction of rotation of the grinder oscillating mechanism is reversed. The shaft 95 is geared to a shaft 97 within the gear case 96 upon which are rotatably mounted oppositely facing bevel gears 98 and 99 which are adapted to be alternately clutched to the shaft by means of a sliding clutch element 100 keyed to the shaft 97 between the gears 98 and 99. The clutch element 100 is shifted back and forth between the gears 98 and 99 by means of a shifter 101, to which is attached an actuating arm 102 which projects through the top of the gear case 96. The arm 102 is provided with an inwardly projecting lug 103 and an outwardly projecting handle 104, the lug 103 lying in the path of members to be later described which are carried by the oscillating support 23, for automatic shifting of the reversing clutch and the handle 104 enabling the operator to control the reversing mechanism manually whenever desired. The oppositely facing gears 98 and 99 are in mesh with a bevel gear 105 interposed between the same, which is fixed to a longitudinal shaft 106, which has fixed thereto a bevel gear 107, which meshes with a bevel gear 108 fixed to a shaft 109 which drives the grinder head oscillating mechanism through a change speed gearing, which will now be described.

The change speed gearing in the drive for the grinder oscillating mechanism permits the speed ratio between the oscillating mechanism and the work spindle drive mechanism to be varied. The shaft 109 has fixed thereto a gear 110, which meshes with one of a series of stepped gears 111, which are fixed to a shaft 112 journaled in the lower portion of a gear housing 113. Above the shaft 112, a parallel shaft 114 is journaled in the housing and this shaft has rotatably mounted thereon a series of stepped gears 115 which mesh with the stepped gears 111 fixed to the shaft 112. The shaft 114 is a hollow shaft and the gears 115 are selectively locked to the shaft 114 by means of a sliding key 116 mounted within the same. The speed of rotation of the shaft 114 is determined by the setting of the slidable key 116, the shaft being driven through the gear 115 which is locked to the shaft by the key 116. The shaft 114 has fixed thereto a gear 117 which meshes with the gear 118 fixed to a shaft 119 which drives the vertical grinder oscillating shaft 47 through a worm 120.

Figures 12, 13, 14, 15:
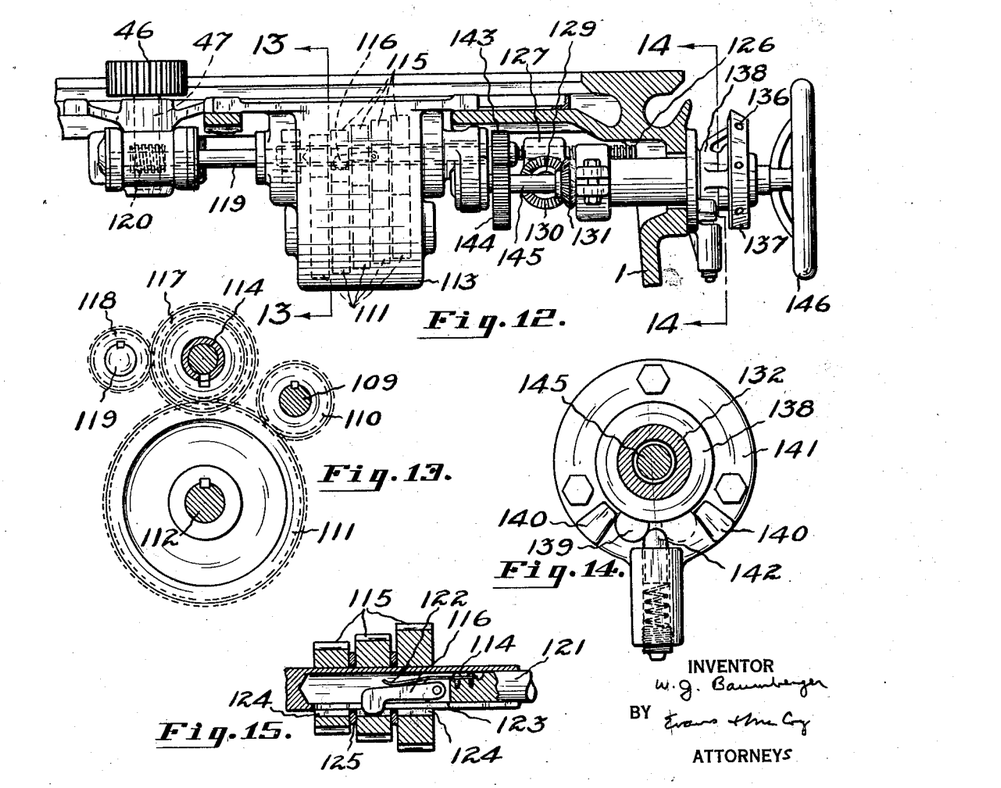
Fig. 12 is a sectional view showing the change speed gearing in side elevation.
Fig. 13 is a section taken on the line indicated at 13—13 in Fig. 12.
Fig. 14 is a section taken on the line indicated at 14—14 in Fig. 12.
Fig. 15 is a longitudinal section through the loose gears of the change speed gearing.
Figure 16:
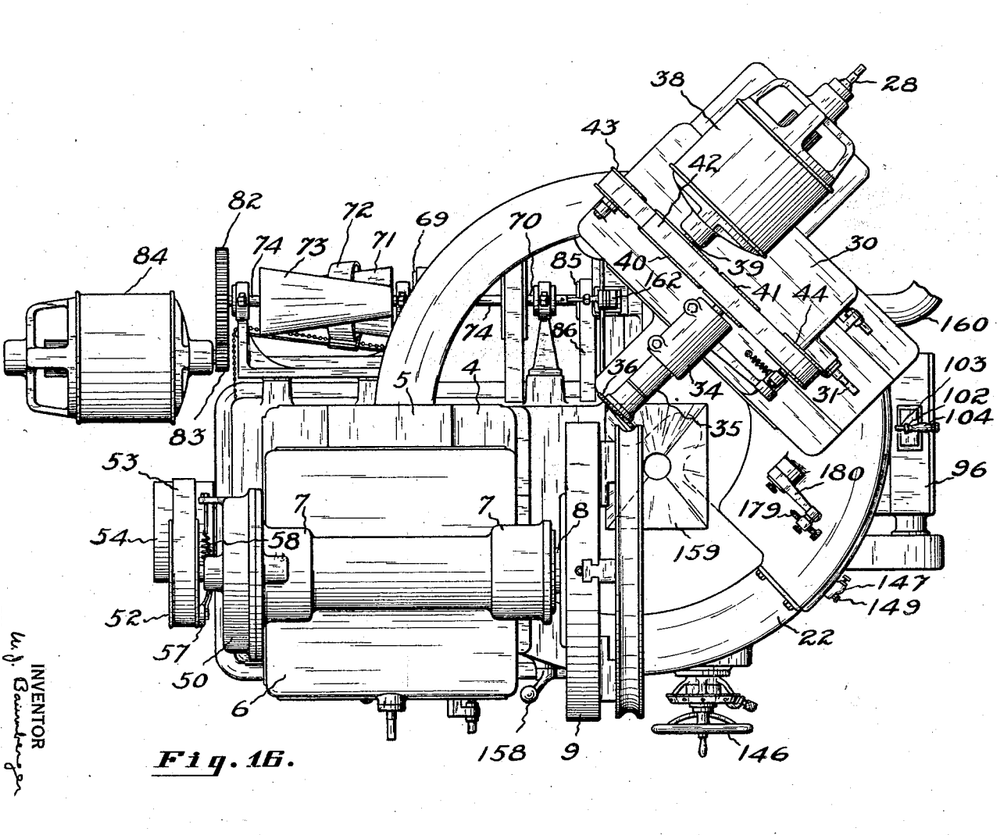
Fig. 16 is a plan view similar to Fig. 2 showing the grinding wheel operating on the outer periphery of the work.

The key 116 is pivoted to the inner end of a rack bar 121 which is slidably mounted in the hollow shaft 114 and is engaged by a leaf spring 122 attached to the bar 121 and pressing the key through a longitudinal slot 123 in the tubular shaft 114 and into notches 124 formed in the hubs of the gears 115. As best shown in Fig. 15, the gears 115 are separated by annular spacers 125 which fit closely upon the shaft 114 so that, when the key 116 rests on one of the spacers 125, it is held within the periphery of the shaft and none of the gears 115 are locked to the shaft, thus providing neutral positions for the clutch key between successive gears. The outer end of the bar 121, which is locked to the shaft by the key 116 and rotates therewith, is provided with regularly spaced circular ribs 126 forming a rack and extends through a fixed housing 127, in which is mounted a pinion carried by a transverse shaft 129 extending through the housing and meshing with the rack. The rack bar 121 is adapted to be adjusted to shift the key 116 into engagement with any gear by rotation of the pinion 128, which causes longitudinal movement of the bar 121. For imparting turning movements to the shaft 129, the shaft 129 has a bevel gear 130 fixed to the end thereof which meshes with a bevel gear 131 fixed to a sleeve 132, which is journaled in an elongated bearing member 133 fixed to a front wall of the supporting frame. The sleeve 132 extends through the outer end of the bearing member 133 and has fixed thereto a handle 134 which carries a locking pin 135 which is adapted to engage with any one of equally spaced apertures 136 in an adjustable spider 137, which is held in fixed positions on the frame. The spider 137 is normally so positioned that when the arm 134 is moved from one aperture 136 to the next, the clutch key 116 will have been shifted from one gear 115 to the next. Means, however, is provided for shifting the spider 137 and with it, the handle 134 and sleeve 132 to a position in which the key 116 rests on a spacer 125 so that all of the gears 115 are free and the shaft 114 is not driven from the motor, thus providing means for disconnecting the grinder oscillating mechanism from the motor so that it can remain stationary to be oscillated or angularly adjusted manually. To obtain this adjustment of the spider 137, the spider is mounted upon a collar 138 which is rotatably mounted upon the sleeve 132 and this collar has a laterally projecting lug 139 which is engageable with spaced outwardly projecting lugs 140 carried by a flange 141 of the bearing member 133, which is bolted to the supporting frame. The lug 139 is locked in engagement with either of the spaced lugs 140 by means of a spring pressed pin 142 which is positioned midway between the lugs 140 and has a rounded inner end engageable with the lug 139, the space between the lugs 140 being just sufficient to permit the lug 139 to be locked between either of the lugs and the pin 142. The lug 139 is rounded so that it can be forced from one position or the other over the rounded end of the locking pin 142, pressing the pin outwardly against the action of its spring as it moves over the pin. The spider 137 may thus be locked in either of two positions. In one of these positions, the apertures 136 are so positioned that, when the arm 134 of the sleeve 132 is locked to the spider by engagement to the pin 135 in one of the apertures, the key 116 will be positioned in engagement with one of the gears 115. In the other position of the spider 137, the apertures 136 are so positioned that, when the arm 134 is locked to the spider by means of the pin 135, the key 116 will be in a neutral position, engaging with one of the spacers 135. While the machine is in operation, the power drive for the grinder oscillating mechanism may be disconnected at any time by simply turning the spider 137 to its clutch releasing position.

In adjusting the grinding wheel with respect to the work, it is often desirable to oscillate the grinding wheel by hand in order to obtain the correct adjustment and means is therefore provided for manually operating the shaft 114 when it is released from the change speed gearing by positioning the key 116 in a neutral position. To this end the shaft 114 has fixed thereto a gear 143 which meshes with a gear 144 on a shaft 145, which extends through the sleeve 132 and has fixed to its outer end a hand wheel 146. By turning the hand wheel 146, the grinder head oscillating shaft 147 may be slowly turned in either direction to move the grinder head about its axis.

Figure 1:
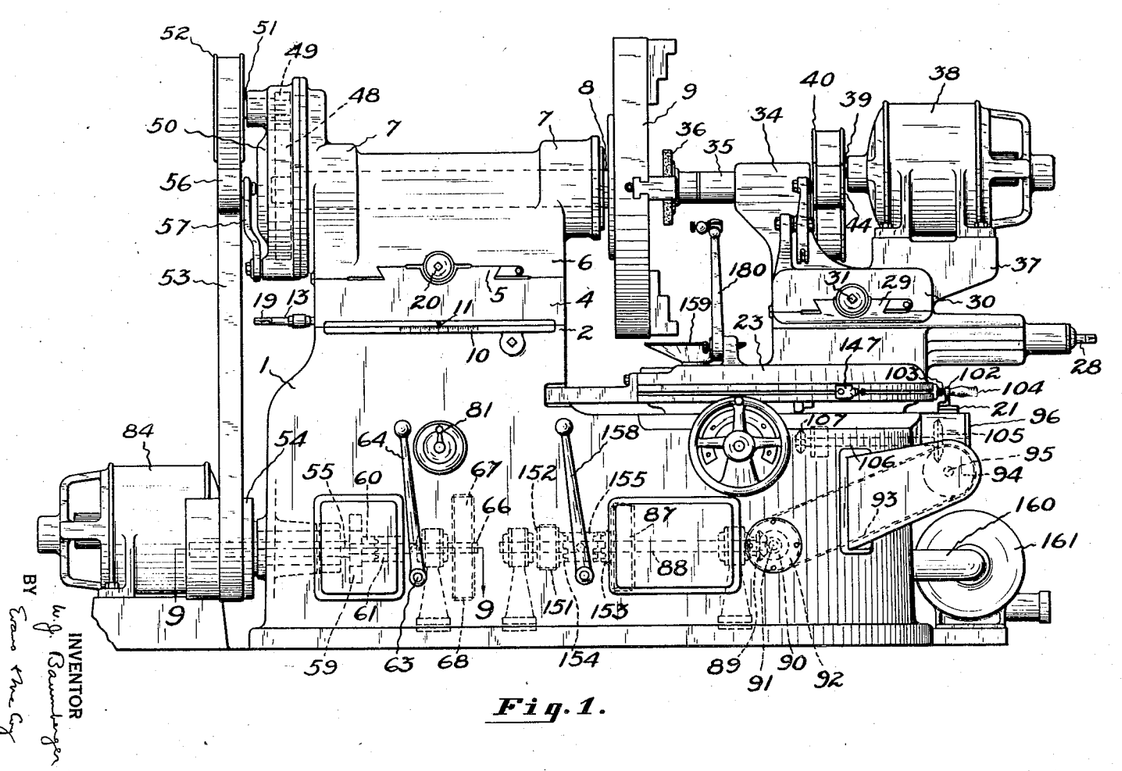
Figure 1 is a front elevation of the grinding machine.
Figure 2:
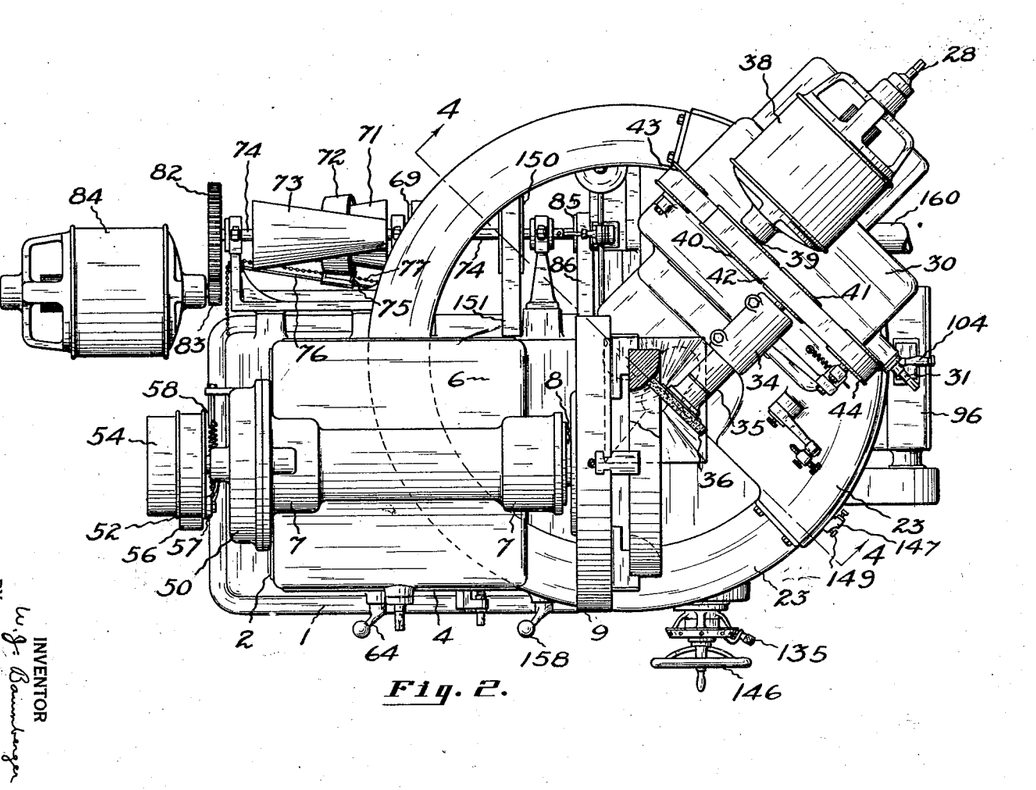
Fig. 2 is a top plan view of the machine.
Figure 3:
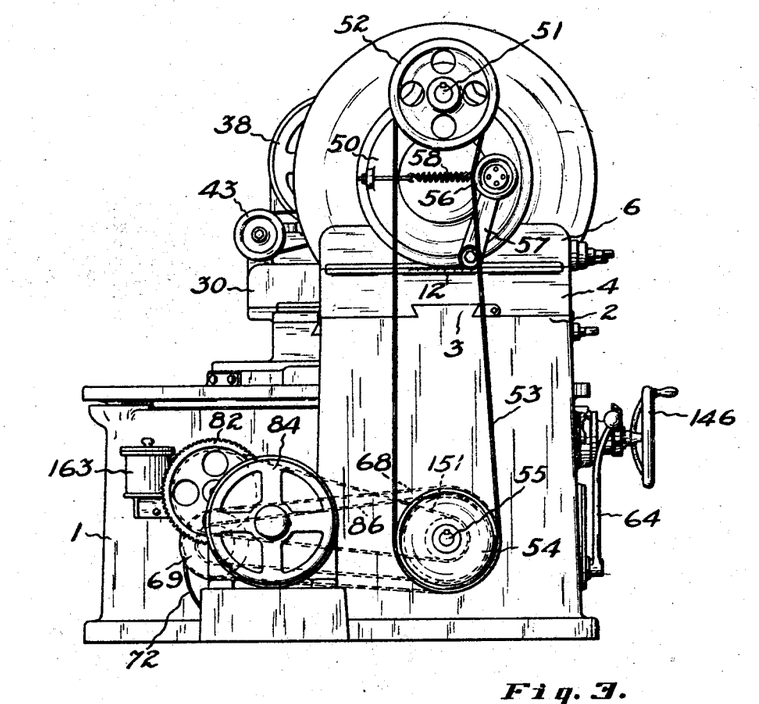
Fig. 3 is an end elevation of the machine.
Figure 4:
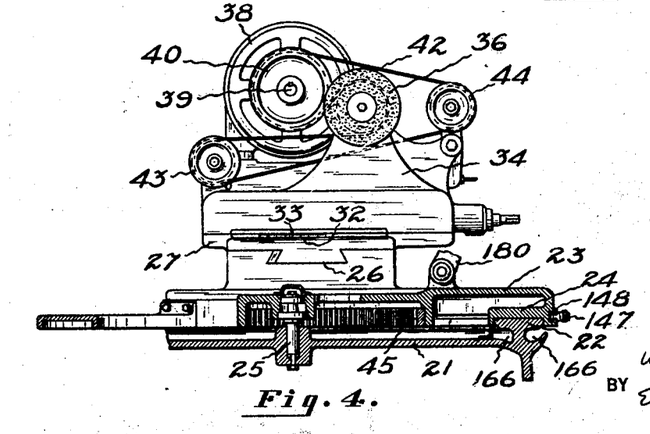
Fig. 4 is a section taken on the line indicated at 4—4 in Fig. 2.
Figures 5, 6, 7:
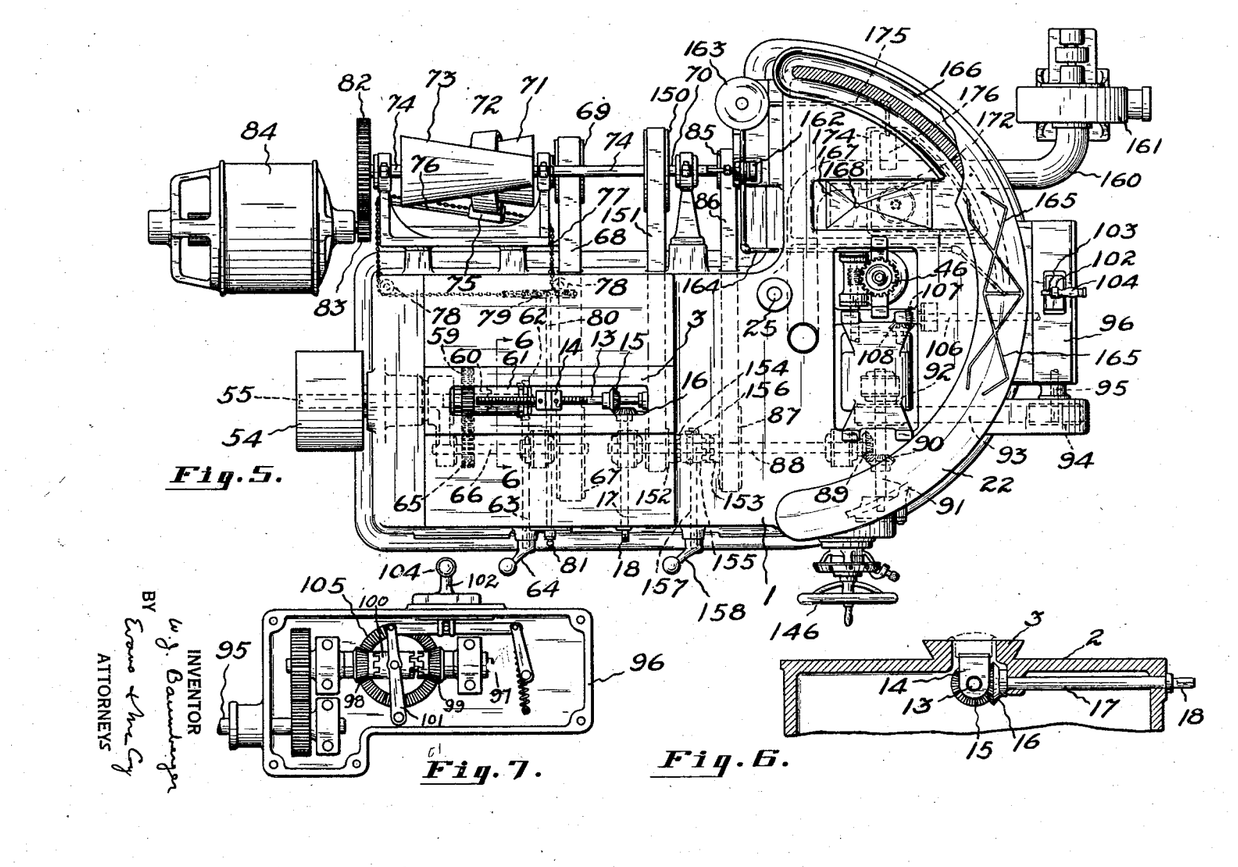
Fig. 5 is a top plan view of the machine with the work supporting and grinder heads removed, a portion of the grinder head support being broken away and shown in section.
Fig. 6 is a section taken on the line indicated at 6—6 in Fig. 5.
Fig. 7 is a detail view showing the reversing gear forming a part of the mechanism for oscillating the grinder head.
Figure 8:
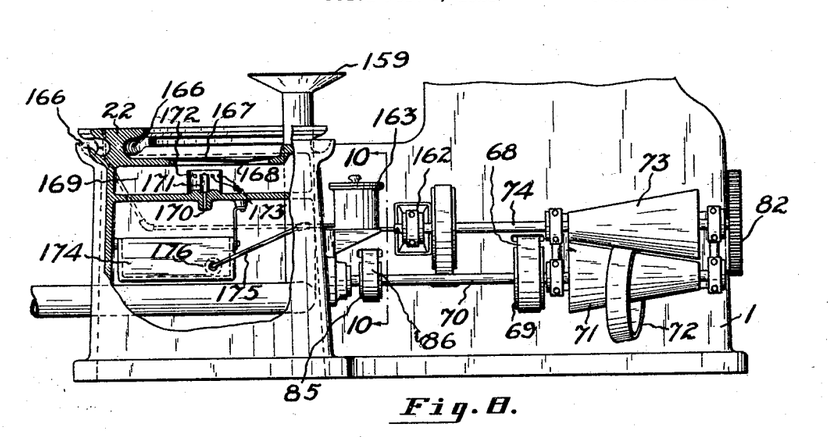
Fig. 8 is a rear elevation of the lower portion of the machine with a portion of the frame beneath the grinder head broken away and shown in section.
Figures 9, 10:
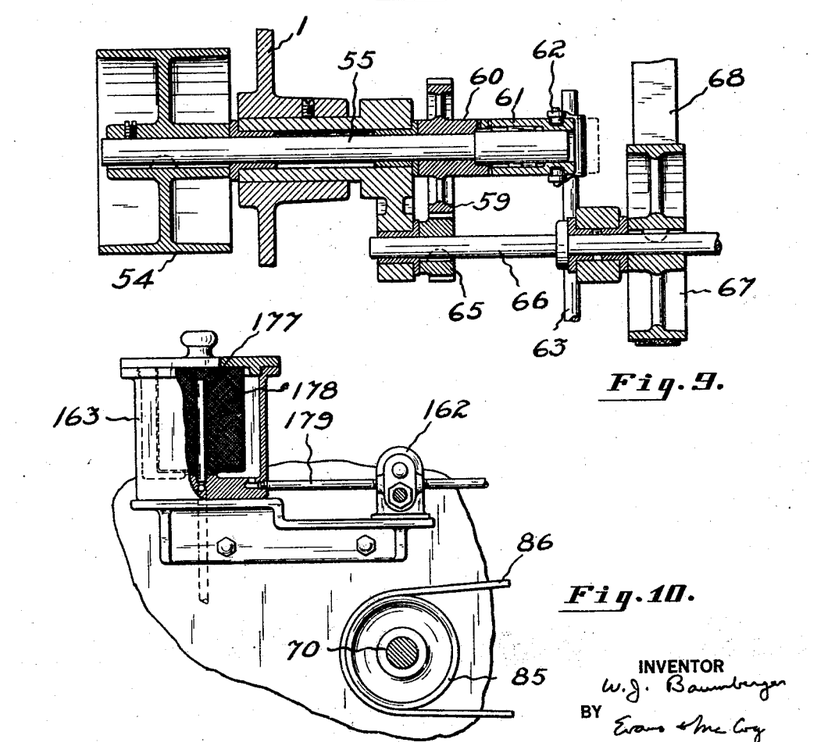
Fig. 9 is a section taken on the line indicated at 9—9 in Fig. 1.
Fig. 10 is a section taken on the line indicated at 10—10 in Fig. 8.
Figure 11:
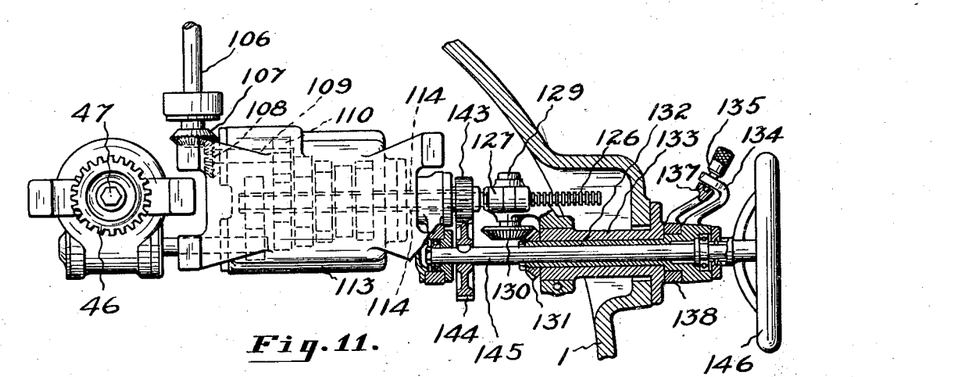
Fig. 11 is a detail view of the change speed gearing forming a part of the mechanism for oscillating the head.

For automatically reversing the direction of movement of the grinding head, the supporting member 23 carries a pair of adjustable stop members 147 which are adapted to engage with the inwardly projecting lug 103 of the clutch shifter arm 102. The stops 147 are mounted to slide in a T-head slot 148 in the periphery of the supporting member 23 and each is provided with a clamping screw 149 by means of which it may be secured in adjusted position. The slot 148 extends throughout the periphery of the member 23 so that the stop members 147 may be positioned as far apart as desired to obtain an oscillatory movement through a large arc or through a small arc. The stops 147 may also be positioned to vary the limits of movement of the supporting member 23 as desired so that the arc of movement of the grinding wheel may be adjusted about the pivotal axis of the supporting member. Thus the grinding wheel may oscillate through a long arc or a short arc and its arc of movement, whether long or short may be adjusted with respect to the axis of oscillation. In Fig. 2 of the drawing, the grinding wheel is shown mounted to oscillate on a convex arc across the interior of an annular piece of work. As shown in this view, the arc of movement is to one side of a longitudinal vertical plane passing through the center of oscillation. If desired, the arc of movement of the grinding wheel could be adjusted to the opposite side of the longitudinal vertical plane through axis of oscillation or to intersect said plane to continue the transverse curve to the exterior of the annular work piece.

In order to obtain rapid adjustments of the grinder head, it is sometimes desirable to shift the head at a rate more rapid than that of normal operation. To this end, means is provided for driving the grinder shifting mechanism from the shaft 74 at a relatively high rate of speed. To this end, the shaft 74 has fixed thereto a large pulley 150 which drives a belt 151, which extends over a small pulley 152 on the shaft 88, through which the grinder head shifting mechanism is normally driven. The pulleys 87 and 151 on the shaft 88 are rotatably mounted on the shaft and are provided with clutch elements 153 and 154 which are adapted to be engaged by a shiftable clutch element 155 slidably keyed to the shaft 88 so that either one of the two pulleys may be clutched to the shaft 88. During normal operation of the machine, the pulley 87 is locked to the shaft, but when a rapid shifting of the grinder head is desired, the clutch element 155 may be engaged with the pulley 152 to obtain more rapid rotation of the shaft 88. The clutch element 155 is engaged by a shifter fork 156 carried by a rock shaft 157 which extends through the front wall of the supporting frame and has attached thereto a lever 158 by which it may be actuated to shift the clutch element 155 into engagement with either of the clutch elements 153 and 154 or to a neutral position when desired.

To collect dust and fine particles of grit during the grinding operation, a flaring suction mouth-piece 159 is positioned beneath the chuck 9 and this suction mouth-piece is connected by a pipe 160 to a suction fan 161 which maintains a strong current of air across the chuck to the mouthpiece to carry particles dislodged from the grinding wheel and work into the suction mouthpiece.

In order to facilitate the oscillatory movement of the grinder head, a system of forced lubrication is provided for the arcuate head supporting guideway which greatly reduces the frictional resistance to angular movement of the head. As shown in Figs. 2, 5, 8 and 10, an oil pump 162 is mounted upon the rear side of the supporting frame and has its rotor connected to the shaft 74. This oil pump receives oil from a supply tank 163 and has a discharge pipe 164 extending up through the arcuate guide member 22 substantially midway between the ends thereof. The guide member 22 has on its upper face zig-zag grooves 165 which extend throughout the length of the supporting face. These grooves receive oil from the discharge pipe 164 and oil is continuously circulated through these grooves into the space between the upper face of the member 22 and the engaging face of the oscillating support 23. The supporting bed 21 is formed to provide a continuous trough 166 to collect oil dripping from the upper face of the arcuate supporting and guiding member 22 and this trough extends entirely around the guide member and delivers into a shallow collecting pan 167, which has a bottom tapering to an outlet opening 168 over an oil collecting and settling chamber 169, located directly beneath the pan 167. The oil collecting and settling chamber 169 has an outlet opening 170 in its bottom which is offset laterally from the opening 168. The outlet opening 170 is surrounded by an upright tubular screen 171 and this screen is surrounded by an upright tubular wall 172, which has openings 173 adjacent the top thereof. The oil collected in the drip pan 167 slowly flows into the settling chamber 169 and gradually fills this chamber to the height of the openings 173, whereupon the oil overflows into the interior of the tubular wall 172 and through the tubular screen 171 into the discharge opening 170. The particles of gritty material in the oil standing in the chamber 169 tend to settle to the bottom so that only the clearer oil flows through the openings 173 to the outlet 170, the fine mesh screen 171 serving to further filter the oil. The oil passes from the outlet 170 into a second settling chamber 174, from which the oil is taken through a pipe 175 to the supply tank 163, a screen 176 being provided in the chamber 174 over the inlet end of the pipe 175. The pipe 175 is connected to the bottom of the tank 165 and communicates with a vertical pipe 177 within the tank which extends to adjacent the top of the tank. A screen 178 surrounds the pipe 177 and a pipe 179 leading from the tank 163 to the pump 162 communicates with the space outside of the screen 178. The oil, after having been passed through the settling chambers 169 and 174 and screens 171, 176 and 178, is thoroughly filtered and of sufficient purity for lubricating purposes. Continuous circulation of oil is thus provided over the supporting surface of the arcuate guide member 22 so that there is very little frictional resistance to movement of the supporting member 23 on the guide 22.

Figure 17:
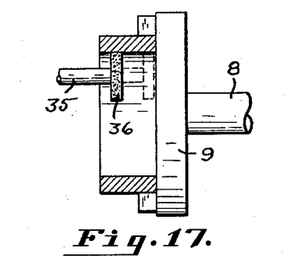
Figs. 17 and 18 show the setting of the work and grinding wheel for generating internal and external cylindrical surfaces.
Figure 18:
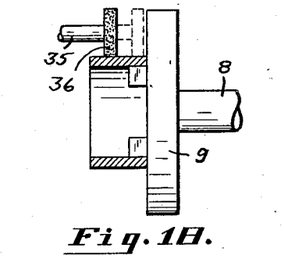

For generating internal or external cylindrical surfaces, the supporting member 23 is disconnected from the oscillating mechanism either by positioning the key 116 in a neutral position or by positioning the clutch member 155 in a neutral position and adjusted to a position in which the spindle 35 is parallel with the spindle 8, as shown in Figs. 17 and 18, the proper lateral adjustment of the spindles being obtained by adjusting the head 6 by means of the lead screw 20 or by adjusting the head 30 by means of the lead screw 31. During the grinding operation, the longitudinal feed of the generating element, (grinding wheel or rotary cutter) may be obtained either by adjusting the slide 4 by turning the lead screw 13 or by adjusting the slide 27 by means of the screw 28.

Figure 19:
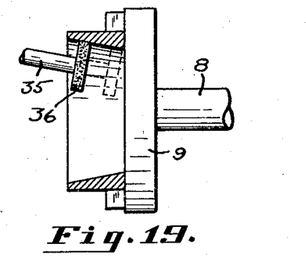
Figs. 19 and 20 show the setting of the grinding wheel and work for generating internal and external conical surfaces.
Figure 20:
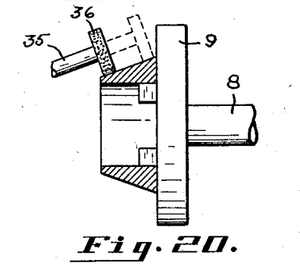

For grinding conical internal or external surfaces, the supporting member 23 with its oscillating mechanism disconnected is adjusted to position the spindle 35 at the proper angle to the spindle 8 as illustrated in Figs. 19 and 20 and the generating element (grinding wheel 36) may be fed along the conical surface by adjusting the slide 27.

Figure 21:
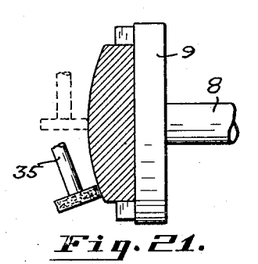
Figs. 21 and 22 illlustrate the action of the grinding wheel and the movements thereof with respect to the work for generating convex and concave spherical surfaces.
Figure 22:
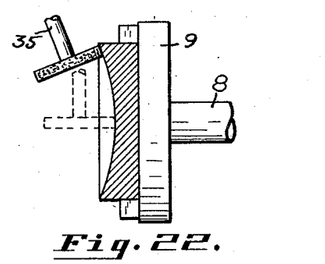
Figure 23:
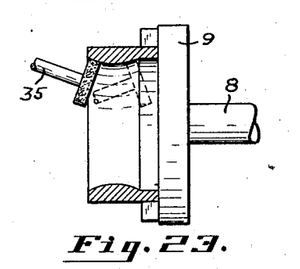
Fig. 23 illustrates the action of the grinding wheel in generating an internal annular rib of uniform curvature in radial planes.
Figure 24:
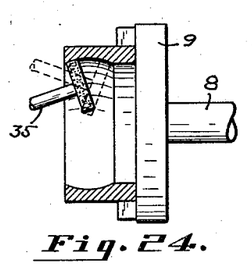
Fig. 24 illustrates the action of the grinding wheel in generating an internal annular groove of uniform curvature in radial planes.
Figure 25:
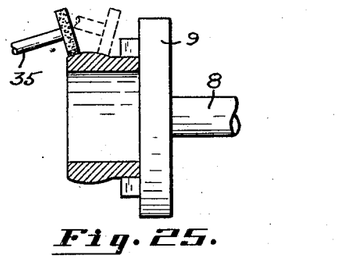
Figs. 25 and 26 illustrate the action of the grinding wheel in generating external and external annular surfaces of uniform curvature in radial planes.
Figure 26:
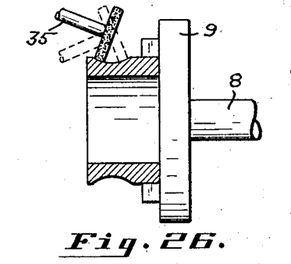
Figure 27:
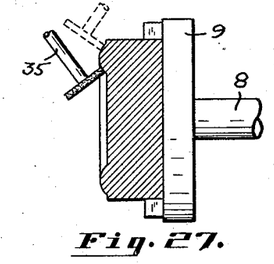
Figs. 27 and 28 illustrate the action of the grinding wheel in generating face ribs and grooves of annular form.
Figure 28:
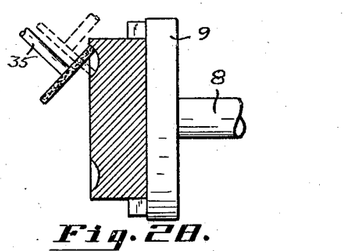

For generating concave or convex spherical surfaces, the work spindle is set to a position such that its axis intersects the axis of oscillation of the generating element and the arc of oscillation of the generating element is adjusted to operate across the face of the work as illustrated in Figs. 21 and 22.

For generating annular concave and convex surfaces the axis of the work spindle is positioned to one side or the other of the axis of oscillation of the generating element and by longitudinal and lateral adjustments of the work spindle head, radial and tangential adjustments of the grinder head and adjustments of the arc of oscillation of the grinder support 23, various annular concave and convex surfaces of any desired diameter and any desired transverse curvature within the limits of adjustment of the machine such as illustrated in Figs. 23 to 28 may be obtained.

For convex surfaces generally the grinding wheel or other generating element may be of cylindrical form but for concave surfaces the grinding wheel should have a rounded edge as shown in Figs. 22, 24, 26 and 28.

It will be readily understood that the form and size of the grinding wheel or other generating tool will be varied as may be necessary or desirable to maintain tangency with the surface of revolution being generated and to provide clearance between the work and oscillating spindle.

It will also be apparent that the present invention provides a universal machine for generating surfaces of revolution on blanks of various sizes and that the machine is capable of use for generating surfaces of revolution having straight line generatrices as well as convex and concave surfaces of revolution having transverse generatrices of uniform curvature; that the machine may be quickly and accurately adjusted for operating upon the interior, exterior or face of a blank for blanks of different sizes and for generating surfaces having different transverse curvatures.

A dressing tool 179 may be provided on an arm 180 adjustably mounted on the oscillatory support 23 by which the periphery of the grinding wheel may be accurately dressed to the proper form when desired.

Furthermore, the present invention provides a machine capable of grinding curved surfaces with extreme accuracy and smoothness by reason of the correlation of the speed of oscillation of the grinder and the speed of rotation of the work and the machine operates with a minimum expenditure of energy due to the slight frictional resistance to oscillating movement of the grinder head.

The mounting of the work spindle permits the chuck 9 to be adjusted longitudinally of the frame toward and past the axis of oscillation of the grinder support 23 by adjusting the slide 4 or upon either side of said axis of oscillation by adjusting the slide 6 so that the work may be positioned to intersect any desired portion of the lateral arc of movement of the grinding wheel. The radial adjustment of the slide 27 on the oscillatory support 23 and the lateral adjustment of the head 30 on the slide 27, permit the radius of the arc of movement of the grinding wheel to be increased or decreased as desired and the wheel to be positioned in any desired position of adjustment laterally with respect to a plane radial to the axis of oscillation so that any desired portion of the periphery of the grinding wheel may be caused to engage the work.

If a cylindrical grinding wheel is employed, the work contacting point may be shifted across the periphery of the wheel during operating to obtain more uniform wear on the wheel periphery by operating the screw 28 from time to time to shift the wheel in a direction transverse of the surface of revolution being generated to shift the point of contact and this feed movement will also serve to take up wear on the grinding wheel until the point of contact has traversed the periphery of the wheel.

In all cases, however, the slide 27 may be adjusted laterally to take up wear on the grinding wheel.

It will be apparent that the present invention provides a machine capable of forming or finishing a great variety of articles such as drawing dies, ball races, and spherical or annular seats for joints, couplings or bearings in addition to cylindrical and conical surfaces.

It should also be noted that the grinder oscillating mechanism operating through the arcuate rack 45 and gear 46 imparts uniform angular movement to the grinder head so that the proper speed ratio is at all times maintained between the speed of the work spindle and the speed of lateral movement of the grinding wheel over the work.

Furthermore, it is to be understood that the particular form of apparatus shown and described, and the particular procedure set forth, are presented for purposes of explanation and illustration and that various modifications of said appartus and procedure can be made without departing from my invention as defined in the appended claims.

What I claim is:

1. In a machine for generating surfaces of revolution, a supporting frame, a supporting member mounted on the frame to turn about a fixed axis, a spindle adjustably mounted on said member, a second spindle adjustably mounted on said frame independently of said supporting member, a generating element carried by one spindle, a work holding chuck carried by the other spindle, mechanism for oscillating said supporting member, a drive shaft and driving connections including a change speed gearing interposed between said drive shaft and work spindle and between said drive shaft and oscillating mechanism, and a second change speed mechanism for varying the speed of oscillation of said member with respect to the speed of rotation of the work spindle.

2. In a machine for generating surfaces of revolution, a supporting frame, a work spindle mounted on said frame, means for adjusting said spindle longitudinally of its axis and transversely of its axis, a supporting member mounted on said frame to turn about a fixed axis, a second spindle adjustably mounted on said supporting member, a generating element carried by said second spindle, means for driving said second spindle, a common driving mechanism including a change speed mechanism for oscillating said supporting member and driving the work spindle.

3. In a machine for generating surfaces of revolution, a supporting frame, a work spindle mounted on said frame, means for adjusting said spindle longitudinally of its axis and transversely of its axis, a supporting member mounted on said frame to turn about a fixed axis, a second spindle adjustably mounted on said supporting member, a generating element carried by said second spindle, means for driving said second spindle, a gearing element carried by said supporting member, a gear meshing with said gearing element, means including a reversing mechanism for alternately rotating said gear in opposite directions, means for controlling said reversing mechanism including a pair of trip members each adjustable independently of the other circumferentially of said supporting member, a drive shaft, a change speed mechanism driven from said shaft and driving connections from said change speed mechanism to said work spindle and from said change speed mechanism to said reversing mechanism.

4. In a machine for generating surfaces of revolution, a supporting frame, a work spindle mounted on said frame, means for adjusting said spindle longitudinally of its axis and transversely of its axis, a supporting member mounted on said frame to turn about a fixed axis, a second spindle adjustably mounted on said supporting member, a generating element carried by said second spindle, means for driving said second spindle, a gearing element carried by said supporting member, a gear meshing with said gearing element, means including a reversing mechanism for alternately rotating said gear in opposite directions, means for controlling said reversing mechanism including a pair of trip members each adjustable independently of the other circumferentially of said supporting member, a drive shaft, a change speed mechanism driven from said shaft, driving connections from said change speed mechanism to said work spindle and from said change speed mechanism to said reversing mechanism, and a change speed mechanism interposed between said reversing mechanism and said gear.

5. In a machine of the character described, a supporting frame, spindles mounted on said frame, means for driving said spindles, a support for one of the spindles mounted to turn about a fixed axis on the frame, a gearing element carried by the support, a gear meshing with said gearing element, power driven means including a reversing mechanism for driving said gear, means for automatically controlling said reversing mechanism, change speed gearing interposed between said reversing mechanism and gear, means for disconnecting said gear from said driving means, and means for manually operating said gear through said change speed gearing to turn said support when said driving means is disconnected.

6. In a machine of the character described, a supporting frame, spindles mounted on said frame, means for driving said spindles, a support for one of the spindles mounted to turn about a fixed axis on the frame, a gearing element carried by the support, a gear meshing with said gearing element, means for driving said gear including an automatic reversing mechanism, a drive shaft and high and low speed driving connections from said shaft to said reversing mechanism, means for connecting the reversing mechanism and drive shaft through either of said driving connections, and manually operable means for controlling said reversing mechanism.

7. In a grinding machine, a work spindle, a grinder spindle, an oscillatory support for one of said spindles, mechanism for oscillating said support, and a driving mechanism common to the work spindle and oscillating mechanism, said driving mechanism including a change speed mechanism adjustable to simultaneously varying the speed of rotation of the work spindle and the speed of oscillation of the support in relatively small increments over a relatively wide range of speeds.

8. In a grinding machine, a work spindle, a grinder spindle, an oscillatory support for one of said spindles, mechanism for oscillating said support, and a driving mechanism common to the work spindle and oscillating mechanism, said driving mechanism including a frictional change speed mechanism adjustable to simultaneously vary the speed of rotation of the work spindle and speed of angular movement of the support with intermerging gradations over a relatively wide range of speeds.

9. In a grinding machine, a work spindle, a grinder spindle, an oscillatory support for one of said spindles, mechanism for oscillating said support, a driving mechanism common to the work spindle and oscillating mechanism, said driving mechanism including a change speed mechanism adjustable to simultaneously vary the speed of rotation of the work spindle and the speed of oscillation of the support in relatively small increments over a relatively wide range of speeds, and a second change speed mechanism interposed between said first change speed mechanism and the support oscillating mechanism for changing the speed ratio between the work spindle and oscillating support.

10. In a grinding machine, a supporting frame, an oscillatory support on the frame, a head adjustably mounted on said support, a grinder spindle carried by said head, a motor carried by said support for driving said spindle, a head adjustably mounted on said frame independently of said support, a work spindle carried by said head, mechanism of oscillating said support, and a driving mechanism common to said work spindle and support oscillating mechanism including a change speed mechanism adjustable to simultaneously vary the speed of rotation of the work spindle and speed of oscillation of said support in relatively small increments over a relatively wide range of speeds.

In testimony whereof I affix my signature.

WILLIAM J. BAUMBERGER.